(12) United States Patent
Rose et al.

(10) Patent No.: US 6,547,284 B2
(45) Date of Patent: Apr. 15, 2003

(54) AUTOMATIC OR MANUAL QUICK RELEASE LATCH

(75) Inventors: Joseph Lorney Rose, Pembroke (CA); Anthony Joseph Francis Corriveau, Pembroke (CA); Kirk Alan Dobbs, Pembroke (CA)

(73) Assignee: Med-Eng Systems Inc., Ottawa (CA)

( * ) Notice: Subject to any disclaimer, the term of this patent is extended or adjusted under 35 U.S.C. 154(b) by 0 days.

(21) Appl. No.: 09/942,687

(22) Filed: Aug. 31, 2001

(65) Prior Publication Data

US 2002/0024216 A1 Feb. 28, 2002

Related U.S. Application Data

(62) Division of application No. 09/288,285, filed on Apr. 8, 1999.

(51) Int. Cl.[7] ................................................. F16L 37/00
(52) U.S. Cl. ........................ 285/1; 285/308; 285/310; 285/124.1
(58) Field of Search .............................. 285/1, 2, 3, 4, 285/308, 39, 310, 311, 124.1

(56) References Cited

U.S. PATENT DOCUMENTS

| | | | | |
|---|---|---|---|---|
| 464,386 A | * | 12/1891 | Patterson | 285/308 |
| 1,150,420 A | * | 8/1915 | Davis | 285/308 |
| 2,099,335 A | * | 11/1937 | Hansen | 285/308 |
| 2,538,259 A | | 1/1951 | Merriman | |
| 2,628,850 A | | 12/1953 | Summerville | |
| 2,722,399 A | * | 11/1955 | Oetiker | 285/308 |
| 2,930,633 A | | 3/1960 | Ethington | |
| 3,132,667 A | * | 5/1964 | Baker et al. | 285/308 |
| 3,279,827 A | | 10/1966 | Brown | |
| 3,527,480 A | | 9/1970 | Larson | |
| 3,608,582 A | | 9/1971 | Lambert | |
| 3,719,194 A | | 3/1973 | Anderson et al. | |
| 3,976,099 A | | 8/1976 | Russell | |
| 4,023,584 A | | 5/1977 | Rogers et al. | |

(List continued on next page.)

FOREIGN PATENT DOCUMENTS

| | | |
|---|---|---|
| CA | 1019363 | 10/1977 |
| CA | 1216701 | 1/1987 |

OTHER PUBLICATIONS

Product Literature/Drawing: HTE 8473 1/4 Twin Self Seal Coupling Socket Assembly.
Product Literature/Drawing: HTE 8145 1/4 Self Seal Coupling Nipple Assembly.
Product Literature/Drawing: Snap– Tite 9731 Coupling Assembling; No Spill.

*Primary Examiner*—Eric K. Nicholson
(74) *Attorney, Agent, or Firm*—Clark & Brody

(57) ABSTRACT

There is provided a new and useful fluid conduit coupling apparatus which allows quick connection and disconnection with substantially no introduction of ambient fluids or air into the process fluid. In one aspect of the invention there is provided a quick connect/disconnect coupling for a fluid conduit, the coupling comprising assemblies for attaching to the ends of a conduit to be connected and for subsequently mating together, each assembly comprising a normally closed channel; means for expelling fluid from between the assemblies when the assemblies are to be connected to each other; means for preventing fluid from entering the assemblies from outside when the assemblies are being connected; means for opening the normally closed channels, means operable by the connecting of the assemblies to each other; latch means for securing the assemblies together, the latch means disconnectable by means of a hand operated unlatching means or by the application of a predetermined tensile force.

12 Claims, 6 Drawing Sheets

U.S. PATENT DOCUMENTS

| | | | | |
|---|---|---|---|---|
| 4,086,939 A | | 5/1978 | Wilcox et al. | |
| 4,105,046 A | | 8/1978 | Sturgis | |
| 4,166,476 A | | 9/1978 | Porter | |
| 4,195,865 A | * | 4/1980 | Martin | 285/308 |
| 4,413,846 A | * | 11/1983 | Oetiker | 285/308 |
| 4,436,125 A | | 3/1984 | Blenkush | |
| 4,541,457 A | | 9/1985 | Blenkush | |
| 4,602,658 A | | 7/1986 | Luther | |
| 4,646,773 A | | 3/1987 | Klop et al. | |
| 4,674,525 A | | 6/1987 | Richards et al. | |
| 4,753,268 A | | 6/1988 | Palau | |
| 4,763,683 A | | 8/1988 | Carmack | |
| 4,794,937 A | | 1/1989 | Hofmann | |
| 4,854,338 A | | 8/1989 | Grantham | |
| 4,863,201 A | * | 9/1989 | Carstens | 285/308 |
| 4,884,591 A | | 12/1989 | Webster | |
| 4,911,655 A | | 3/1990 | Pinyan | |
| 4,917,149 A | | 4/1990 | Grantham | |
| 4,949,745 A | | 8/1990 | McKeon | |
| 4,971,096 A | | 11/1990 | Perrine | |
| 4,982,736 A | | 1/1991 | Schneider | |
| 4,991,626 A | | 2/1991 | Grantham | |
| 5,033,777 A | | 7/1991 | Blenkush | |
| 5,052,725 A | | 10/1991 | Meyer | |
| 5,092,364 A | | 3/1992 | Mullins | |
| 5,104,158 A | | 4/1992 | Meyer | |
| 5,126,041 A | | 6/1992 | Weber | |
| 5,176,162 A | | 1/1993 | Jones et al. | |
| 5,211,197 A | | 5/1993 | Marrison et al. | |
| 5,215,122 A | | 6/1993 | Rogers et al. | |
| 5,232,020 A | | 8/1993 | Mason et al. | |
| 5,316,041 A | | 5/1994 | Ramacier, Jr. et al. | |
| 5,323,808 A | | 6/1994 | Shimizu | |
| D357,307 S | | 4/1995 | Ramacier | |
| 5,429,155 A | | 7/1995 | Brzyki et al. | |
| 5,464,042 A | | 11/1995 | Webster | |
| 5,494,074 A | | 2/1996 | Ramacier | |
| 5,529,085 A | | 6/1996 | Richards | |
| D384,712 S | | 10/1997 | Scott | |
| 5,791,366 A | | 8/1998 | Lo | |
| 5,845,943 A | * | 12/1998 | Ramacier, Jr. et al. | 285/308 |
| 5,911,403 A | | 6/1999 | deCler et al. | |
| 5,975,489 A | | 11/1999 | deCler et al. | |
| 6,024,124 A | | 2/2000 | Braun et al. | |
| 6,082,401 A | | 7/2000 | Braun et al. | |

* cited by examiner

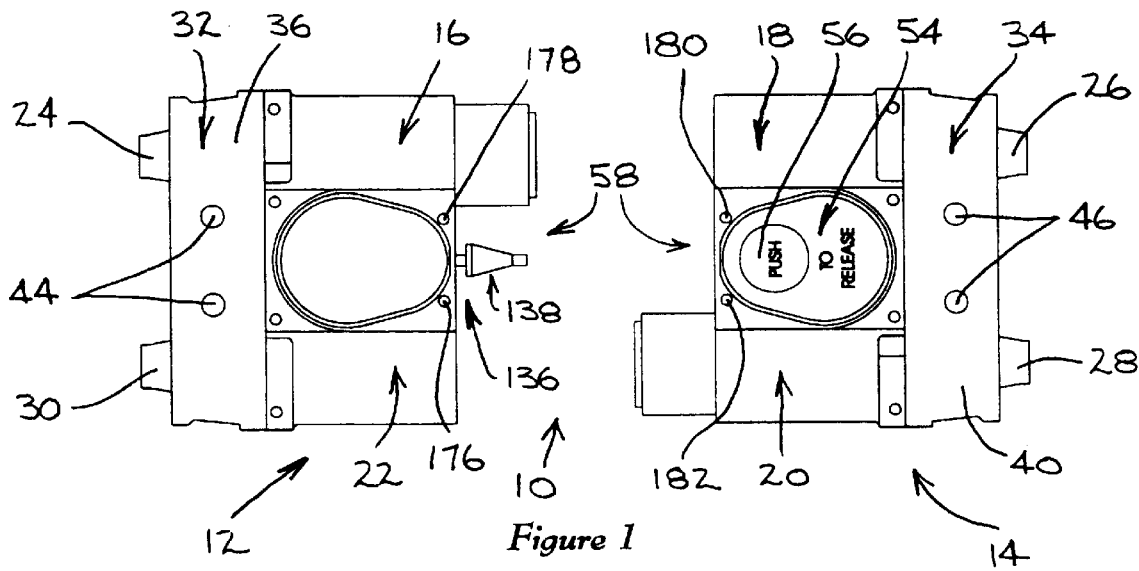
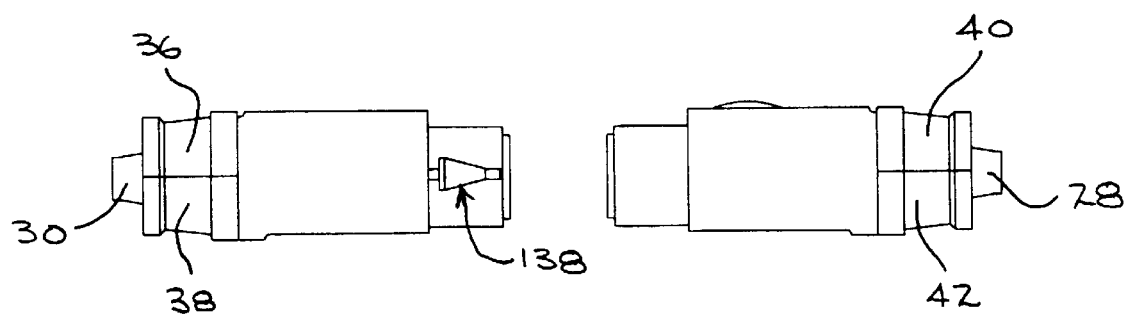
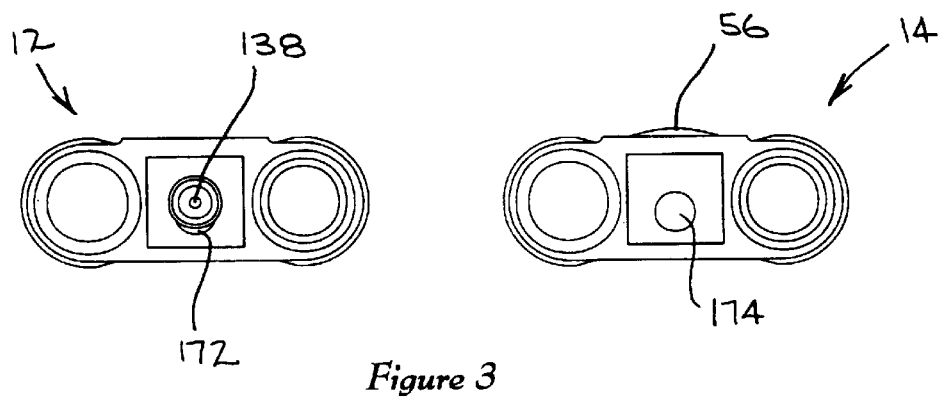

AUTOMATIC OR MANUAL QUICK RELEASE LATCH

This application is a divisional application of U.S. Ser. No. 09/288,285, filed Apr. 8, 1999.

FIELD OF THE INVENTION

This invention relates to a fluid conduit coupling device which allows the simultaneous coupling or uncoupling of pairs of fluid conduits substantially without the loss of process fluid or the introduction of air or ambient fluid, and which will automatically uncouple with the application of a predetermined tensile force.

BACKGROUND Of THE INVENTION

It is desirable to have a means of coupling and uncoupling fluid conduits such as hoses without the need to drain the hoses prior to coupling or risk fluid loss. Moreover, it is desirable to have a means to couple fluid conduits without introducing contaminants such as ambient fluids and air into the process fluid. In situations where it is foreseeable that it might be necessary to uncouple the fluid conduits very quickly, or under other circumstances preventing the use of a manually actuated release, it is desirable to have a means of disconnecting the fluid conduits by the application of a predefined amount of tensile force on the fluid conduits, preferably without damage to the conduits or the coupling, and in a manner allowing rapid recoupling without the need for prior repair. Such decoupling should occur without fluid leakage from the conduits.

Such quick-connect/quick disconnect dry-break connectors are especially desirable for use with liquid-circulating personal temperature maintenance systems, particularly when such devices are used by those piloting or driving vehicles from which rapid ejection, possibly followed by reconnection, may become necessary.

Numerous detachable fluid conduit coupling systems are known in the prior art. Many such devices employ spring-loaded ball-type valves which may reduce the loss of process fluid upon uncoupling. Such systems are described in U.S. Pat. No. 4,105,046 of Sturgis, and U.S. Pat. No. 5,092,364 of Mullins, both of which describe detachable fluid couplings. However, systems of this type fail to provide a means to substantially prevent the introduction of contaminants such as air and ambient fluids into the process fluid upon coupling. This is because the spring-loaded ball type valves lack a means to expel potentially contaminating materials from the valve surfaces prior to joining.

U.S. Pat. No. 4,794,937 of Hoffman describes a plug and socket-type plug coupling designed for application in high pressure systems. The design of this coupling necessitates the use of gaskets recessed within the coupling apparatus and does not provide a means of expelling ambient fluids or air prior to coupling.

Most fluid coupling systems are not adapted to allow damage-free separation of the connector ends upon the application of tensile force when a manual release mechanism has not been actuated. This can result in the loss of significant quantities of process fluid due to conduit rupturing when emergency separation becomes necessary. In situations where the process fluid is potentially dangerous, this can pose a substantial hazard. Moreover, should separation not occur under conditions where it is necessary the device through which fluid was being circulated may be dragged behind or into the fluid source device, resulting in injury and property damage.

U.S. Pat. No. 5,529,085 of Richards et al teaches a breakaway hose coupling designed to limit the loss of process fluid upon the separation of the coupling. This design relies on the breakage of shear pins to effect release of the coupled hoses. Thus, while an emergency release system is provided, it is not a quick-connect/quick release system. Moreover, design is not adapted to exclude ambient fluid and air upon hose coupling.

The most common commercially available fluid quick-connector types known to the inventors are those produced by Colder Products Company of Minnesota, U.S.A. Features of these connectors are detailed in U.S. Pat. Nos. 4,436,125, 4,541,457, 4,911,655, 5,033,777, 5,052,725, 5,104,158, 5,126,041, 5,494,074, 5,845,943, and D357,307 and D384,712. Some connectors manufactured by Colder Products Company purport to have self-sealing valves. However, due to design factors, a substantial amount of process fluid is typically lost when these valves are uncoupled, and a substantial amount of ambient fluid or air is introduced into the process fluid upon coupling. Moreover, no Colder Products Company valve is known to the inventors which uncouples automatically upon the application of a predetermined tensile force.

SUMMARY OF THE INVENTION

It is thus an object of the present invention to provide a fluid conduit coupling apparatus which allows quick connection and disconnection with substantially no introduction of ambient fluids or air into the process fluid.

In one aspect of the invention there is provided a quick connect/disconnect coupling for a fluid conduit, the coupling comprising assemblies for attaching to the ends of a conduit to be connected and for subsequently mating together, each assembly comprising a normally closed channel; means for expelling fluid from between the assemblies when the assemblies are to be connected to each other; means for preventing fluid from entering the assemblies from outside when the assemblies are being connected; means for opening the normally closed channels, means operable by the connecting of the assemblies to each other; latch means for securing the assemblies together, the latch means disconnectable by means of a hand operated unlatching means or by the application of a predetermined tensile force.

BRIEF DESCRIPTION OF THE DRAWINGS

These and other advantages of the invention will become apparent upon reading the following detailed description and upon referring to the drawings in which:

FIG. 1 is a top view of a preferred form of a coupler according to the invention, in a disconnected state;

FIG. 2 is a side view of the coupler of FIG. 1;

FIG. 3 is an end view of the coupler of FIG. 1, illustrating the two ends of the coupler which are juxtaposed in FIG. 2;

DETAILED DESCRIPTION OF THE PREFERRED EMBODIMENTS

Figure 4:
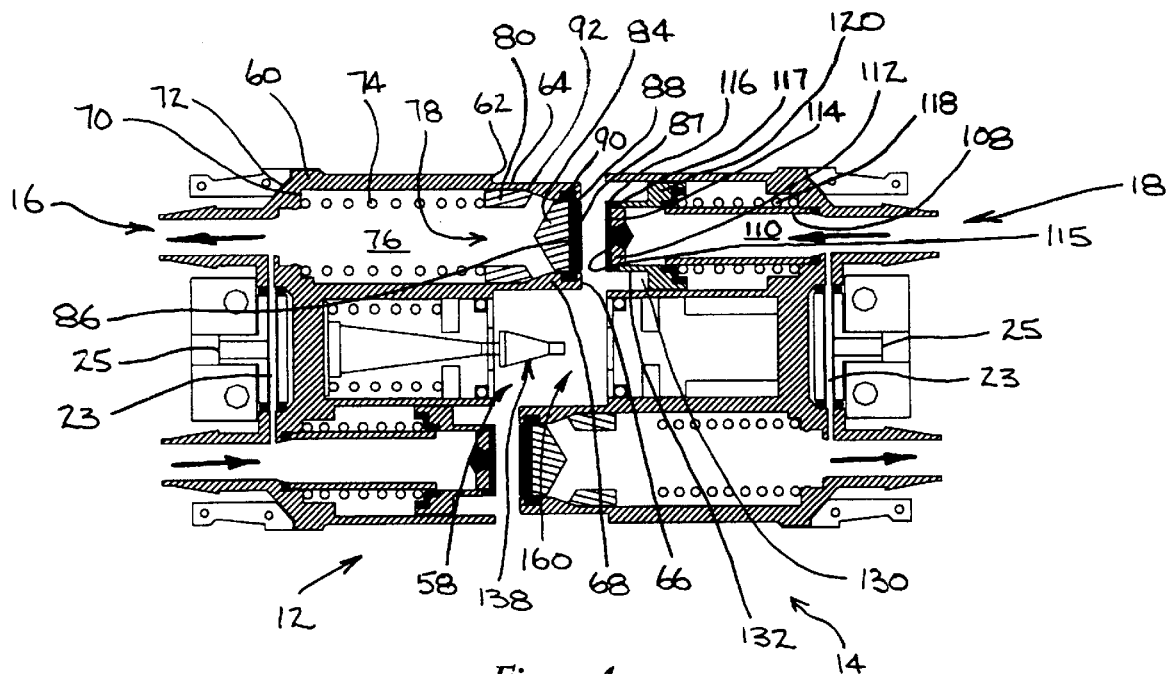
FIG. 4 is a cross-sectional top view of the coupler of FIG. 1 in a completely disconnected state.

In the following description, similar features in the drawings have been given similar reference numerals. The drawings illustrate a double or twin coupling for connecting together two pairs of conduits or for inserting at an intermediate point in a pair of conduits. It should be noted that the coupling can equally be constructed for use as a single coupling in a single conduit. In that case one flow passage or channel is either not present or not used. The coupling can also be constructed as a multiple coupling for a group of conduits.

With reference to FIGS. 1 to 3, there is illustrated one preferred form of the coupler according to the invention. Thus, the coupler 10 comprises first and second parts 12 and 14 respectively which are configured to meet together, as will be discussed, and as illustrated in cross section in FIG. 6.

Each of parts 12 and 14 are provided with flow passage or channel assemblies 16, 18, 20 and 22. The channels provide flow passages through parts 12 and 14 but the flow is interruptible, as will be discussed.

Each of parts 12 and 14 may include a bypass channel 23, a primary purpose of which is to allow some circulation for maintenance of temperature uniformity in the system. Where not necessary, the bypass channels may simply be blocked or omitted. Where the coupling is constructed for use in a single conduit, no bypass will be present.

Hose barbs 24, 26, 28 and 30 provide for the securing of respective conduit ends to parts 12 and 14. Tail clamps 32 and 34, consisting of identical parts 36 and 38, and 40 and 42, respectively, are secured together by means of fasteners such as screw pairs 44 and 46 to securely clamp the conduit ends to the hose barbs. In applications where safety precludes the use of screws, pins or rivets may be used.

The tail clamps serve not only to secure the conduits to the coupling but may also to relieve strain as between the conduits and the channel assemblies, to provide a protective shield over bypasses 23, and to provide a thermal and/or pressure sensor receptacle through the thermal well 25.

Figure 7:
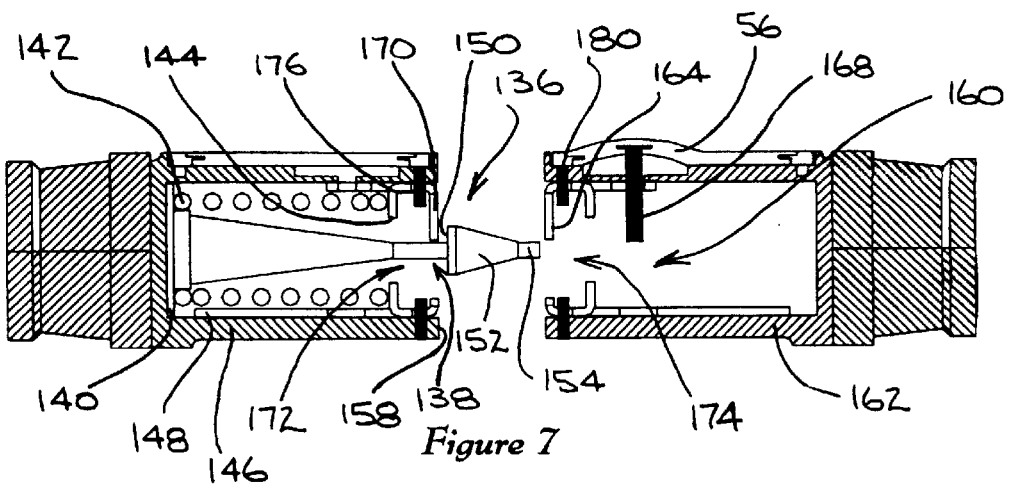
FIG. 7 is a cross-sectional side view of the coupler of FIG. 1 showing a preferred latch assembly in a completely uncoupled state.

Part 12 includes the latch pin 138 which, upon connecting together parts 12 and 14 of coupler 10, is inserted into a receptacle assembly 160 (refer to FIG. 7) which contains a latch plate 164. As will be described later, the latch pin 138 locks with the latch plate 164 to secure a coupler in a connected state.

The part 14 includes a manual release assembly 54 which, on application of pressure to the release button 56 causes the latch pin 138 to unlock from latch plate 164.

Figure 5:
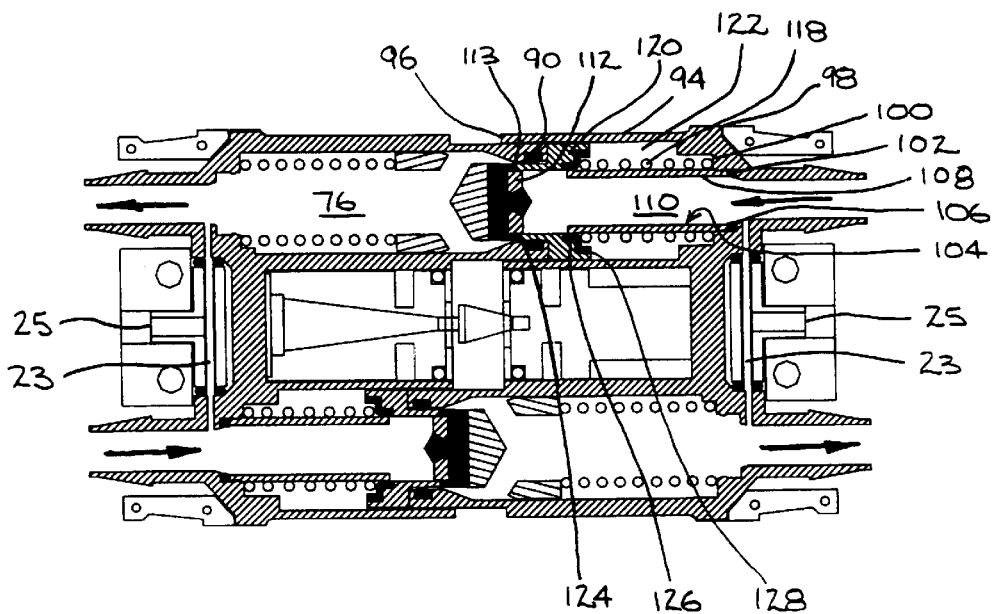
FIG. 5 is a cross-sectional top view of the coupler of FIG. 1 in a partially disconnected state.
Figure 6:
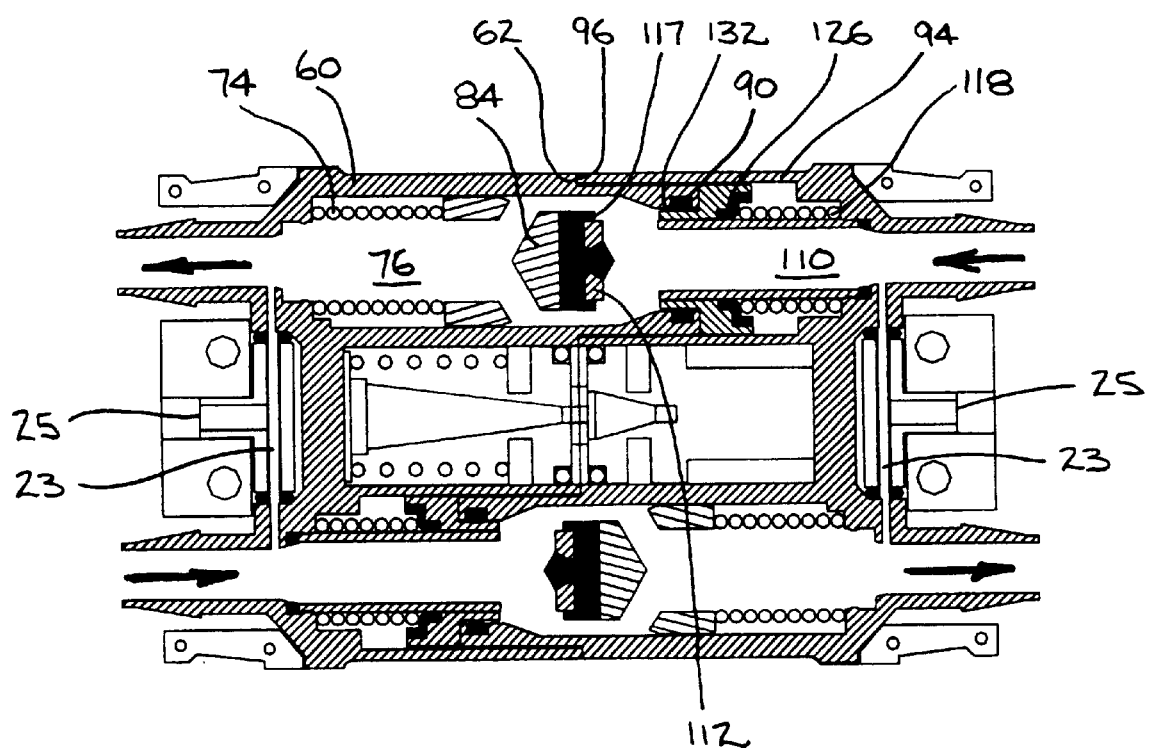
FIG. 6 is a cross-sectional top view of the coupler of FIG. 1 in a completely connected state.

FIGS. 4 to 6 illustrate the flow channel assemblies in detail. As with all of the series of figures, the coupler is shown in a double configuration for insertion between two pairs of conduit ends. More particularly, the figures illustrate a form of the coupler which is preferably used as part of a supply and return system, whereby a fluid supply flows in one direction through one side of the coupler and in the opposite direction to the other side of the coupler. Thus, FIGS. 4 to 6 illustrate direction of flow by means of the arrows. Furthermore, the figures progressively illustrate the coupler in a disconnected state in FIG. 4, a partially connected state in FIG. 5, and a connected state in FIG. 6.

The parts 12 and 14 of coupler 10 are the same insofar as the channel assemblies are concerned, and differ only in latch assembly 58, in that part 12 includes latch pin 138 and associated parts, and part 14 includes receptacle assembly 160. Since the two flow channels through the coupler are the same, it is necessary to describe in detail one side only.

Thus, channel assembly 16 in part 12 comprises a channel wall 60 which houses the assembly components. Channel wall 60 is stepped on the outside thereof at 62 to provide a length 64 of decreased outside diameter extending to the end 66 of wall 60.

The inside of wall 60 is profiled to provide a part 68 of decreased inside diameter.

Channel wall 60 is also stepped internally to provide a shoulder 70 adjacent end 72 of channel wall 60.

A coil spring 74 is seated within channel 76 against shoulder 70.

Figure 13:
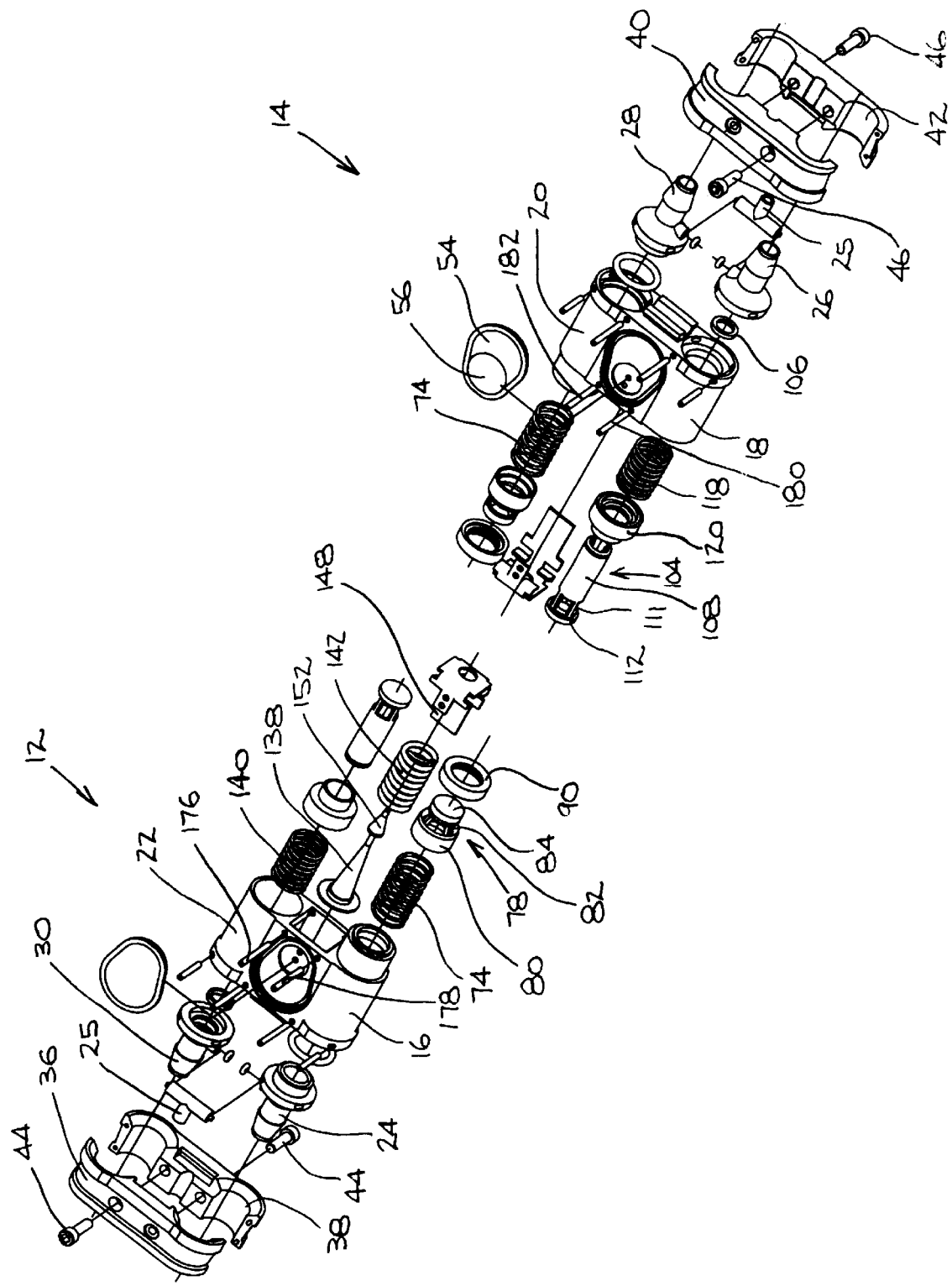
FIG. 13 is an exploded perspective view of two halves of a coupler according to FIG. 1.

Closure means comprising a shuttle 78 (refer to FIG. 13) comprises a base ring 80, a series of struts 82 and a plug 84. Plug 84 includes a leading surface 86.

A sealing ring 88 is disposed around plug 84, and a complimentary sealing ring 90 is fitted within area 68 of channel wall 60.

In the preferred configuration the leading surface 86 is overlaid by an elastomeric cap comprising a face seal 87 and integral sealing ring 88.

In the normal disconnected position of the coupling, as illustrated in FIG. 4, shuttle 78 is biased by spring 74 to close off the opened end of the channel. In that condition the sealing rings 88 and 90 combine to prevent fluid leakage. The face seal 87 of shuttle 78 is substantially flush with the end 66 of channel wall 60 and is held in that position by the abutment of base ring 80 against the narrowing interior of channel wall 60 at 92.

The shuttle 78 is free to move within the channel wall 60 against the force of spring 74 when sufficient force is applied to the leading surface 86 of shuttle 78.

Turning to the complimentary part 14, the channel wall 94 has an inside diameter at end 96 which is matched to the outside diameter of channel wall 60 of part 12 at area 64.

Toward opposite end 98 of channel wall 94 the wall is stepped to form shoulders 100 and 102. A side vent tube 104 (refer to FIG. 13) is seated against shoulder 102 and fixed to channel wall 94. Seal 106 provides sealing as between tube 104 and shoulder 102 of channel wall 94. Seal 106 may be omitted where side vent tube 104 is welded directly to shoulder 102.

Side vent tube 104 consists of lower tubular part 108 which actually defines within it a part of channel 110. From the end of tubular part 108, a group of struts 111 support plugs 112. The struts 111 are preferably extended along the length of tubular part 108 to form reinforcing ribs. Plug 112 includes a leading surface 114, a peripheral seal 116 and a sealing ring 117. Preferably the leading surface 114 is flush with the end 96 of channel wall 94.

In the preferred configuration, the leading surface 114 is overlaid by an elastomeric cap which forms a face seal 115 integral with peripheral seal ring 116 and sealing ring 117. The plug 112 preferably includes a shoulder 113 into which sealing ring 117 is molded.

A coil spring 118 is disposed about tubular part 108 and seated against shoulder 100 of channel wall 94.

To complete the closure means in the channel assembly 18, an annular slider 120 is disposed about side vent tube 104 and is freely slidable in the annulus 122 between the channel wall 94 and the tubular part 108. Slider 120 is provided with a sealing surface 124 at one end and a sealing ring 126 at the other end. Slider 120 also includes a shoulder 128 which seats against spring 118. When the channel 110 is in the normally closed position when the parts 12 and 14 are disconnected, as illustrated in FIG. 4, slider 120 is biased by spring 118 to a position where sealing surface 124 seals against sealing ring 117 of plug 112, and sealing ring 126 seals against tubular part 108 to thereby prevent leakage into or out of channel 110.

Axial force exerted against the slider 120 will permit the slider to move against the biasing force of spring 118.

Without considering for the moment the latch assemblies 58, the operation of the channel assemblies will be described with reference to the three positions illustrated in FIGS. 4 to 6. FIG. 4 illustrates the coupler in a disconnected state in which the springs 74 and 118 respectively bias the shuttle 78 and the slider 120 into positions in which the channels are closed to the outside, so that no leakage can occur either inwardly or outwardly.

When the two parts 12 and 14 are moved together axially as illustrated in FIG. 5, the first contact will be between the leading surfaces 86 and 114 of shuttle 78 and side vent tube 104 respectively. When this contact is made, any ambient fluid, whether liquid or atmospheric air, will be substantially expelled from the area between the surfaces.

As parts 12 and 14 are further overlapped by additional axially movement, the end 66 of channel wall 60 moves into the annular space 130 between channel wall 94 and the leading land 132 of slider 120. At the same time, plug 112 is forcing shuttle 78 into channel 76 against the bias of spring 74, resulting in sealing ring 90 in channel wall 60 to be first transferred to peripheral seal 116 of plug 112 and then to engagement with the leading land 132 of slider 120. The movement of the shuttle thus opens a flow path between struts 82 of shuttle 78 and the wall 60. However during this motion the channels 76 and 110 are effectively sealed against inward or outward leakage at their interface by the sealing rings 90, 117 and 126.

As further axial movement occurs, the end 66 of channel wall 60 abuts against shoulder 134 of slider 120. As parts 12 and 14 are forced into the connected state, the end 66 of channel wall 60 forces slider 120 to move against the bias of spring 118. This movement of slider 120 opens the flow path between the struts 111 of side vent tube 104, so that fluid can begin to flow through the side vents. This thus opens flow between channels 76 and 110 and effectively seals against inward and outward leakage to the ambient. At the same time, the shuttle 78 remains restrained by leading surface 114 of plug 112 and is moved further within channel wall 60 against the force of spring 74.

As is clear from FIG. 6, a flow path is also opened around the outside of plug 84 and plug 112 of shuttle 78 and side vent tube 104 respectively.

When fully coupled, end 96 of channel wall 94 abuts shoulder 62 of channel wall 60.

The coupler has thus been connected in a way which prevents leakage either into or out of the unit.

In disconnecting, the process is simply reversed, so that shuttle 78 and slider 120 are caused by springs 74 and 118 respectively to return to their initial positions to close off the channels to again prevent leakage in the disconnect step.

Turning to FIGS. 7 to 12, the latch assemblies 58 are illustrated in detail.

The pin assembly 136 comprises latch pin 138 having a base plate 140. A spring 142 is disposed around latch pin 138 and is seated against base plate 140. Spring 142 is held under compression by spring retainer 144. Thus spring 142 maintains a constant bias against base plate 140.

Base plate 140 and latch pin 138 are together slidable within the latch pin housing 146. However, the extent of sliding movement of base plate 140 is limited on one side of housing 146 by plate 148. Plate 148 thus acts as a stop for one side of base plate 140.

Latch pin 138 includes a shoulder 150 which is preferably formed by positioning a cone-shaped part 152 on latch pin 138. Latch pin 152 is then extended at 154 beyond the end of cone-shaped part 152.

As is evident from the drawings, the forward area of the latch pin 138, particularly including the shoulder 150 extends beyond the end 158 of latch pin housing 146.

Turning to receptacle assembly 160, the receptacle housing 162 includes a latch plate or striker plate 164 which extends down into the interior of housing 162.

A manual release button 56, disposed on the outside of receptacle housing 162, has fixed thereto a manual release pin 168. Button 56 is biased toward the upward position shown in FIGS. 7 to 9 and 11 to 12 in which the manual release pin 168 may be said to be in a rest position.

The outer part 170 of spring retainer 144 and the latch plate 164 leave openings 172 and 174 at the entries to latch pin housing 146 and receptacle housing 162 respectively. Openings 172 and 174 are configured such that latch pin 138 can be tilted relative to the axis of the housings.

The spring retainer 144 and latch plate 164 are secured in position by shear pins 176 and 178, and 180 and 182 respectively.

The operation of the latch assembly 58 is illustrated sequentially in FIGS. 7 to 12. Those figures illustrate both manual and automatic disconnection and also illustrate a safety feature provided by the shear pins.

Figure 8:
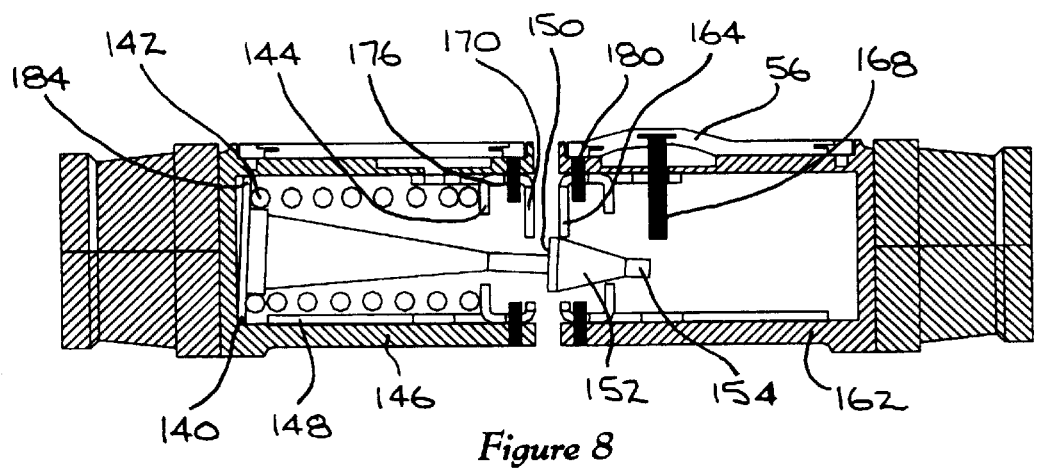
FIG. 8 is a cross-sectional side view of the coupler of FIG. 7 showing the latch assembly in an intermediate state just prior to complete coupling or complete uncouplings.
Figure 9:
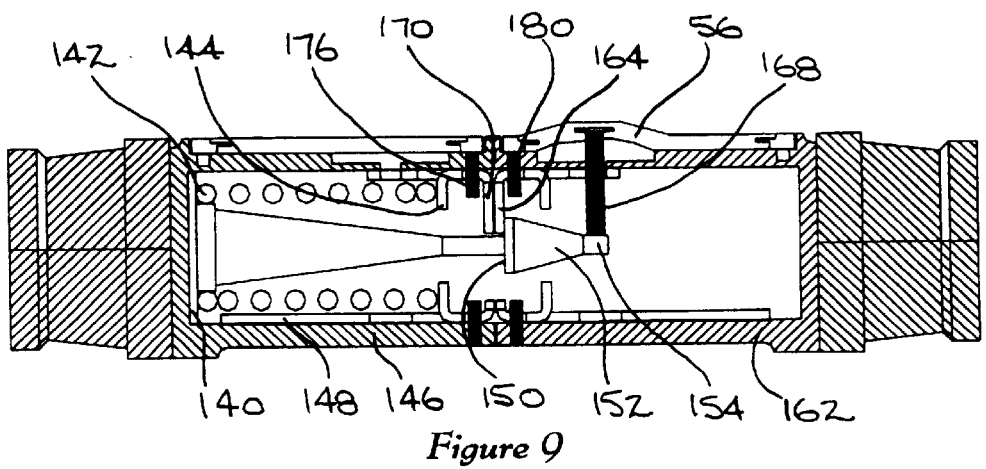
FIG. 9 is a cross-sectional side view of the coupler of FIG. 7 showing the latch assembly in its completely coupled state.
Figure 10:
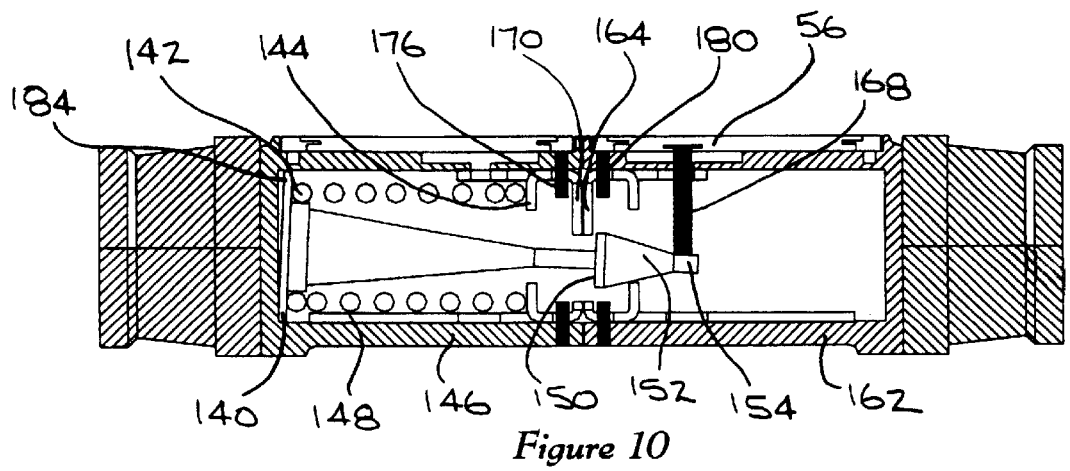
FIG. 10 is a cross-sectional side view of the coupler of FIG. 7 showing the latch assembly in an intermediate state immediately prior to uncoupling using the manual release button.

When the parts 12 and 14 of coupler 10 are brought together, latch pin 138 extends out of the opening 172 in latch pin housing 146 and through the opening 174 in receptacle housing 162. As the parts are moved more closely together, as illustrated in FIG. 8, the conical part 152 is deflected by latch plate 164. The latch pin 138 is biased against deflection by spring 142 acting on base plate 140. Because base plate 140 is free to slide within latch pin housing 146, when latch plate 164 deflects latch pin 138, one side 184 of base plate 140 tilts against the force of spring 142. When shoulder 150 passes latch plate 164, the force of spring 142 acting on side 184 of base plate 140 causes latch pin 138 to snap back to the rest position along the axis of the housing so that shoulder 150 is locked behind latch plate 164. The coupling is now locked in the position illustrated in FIG. 9.

There are three possible means of disconnecting the latch assemblies. First, the assemblies may be disconnected manually by depressing button 56 which acts through manual release pin 168 on the extended part 154 of latch pin 138. The latch pin is then deflected to the position shown in FIG. 10. The two parts 12 and 14 could then simply be pulled apart. However, since in the connected position the springs 74 and 118 in the channel assemblies 16 and 18 are in compression, the springs will cause the two parts 12 and 14 to spring apart as soon as the shoulder 150 is caused by the release pin 168 to clear latch plate 164. That thus describes the manual disconnection.

Figure 11:
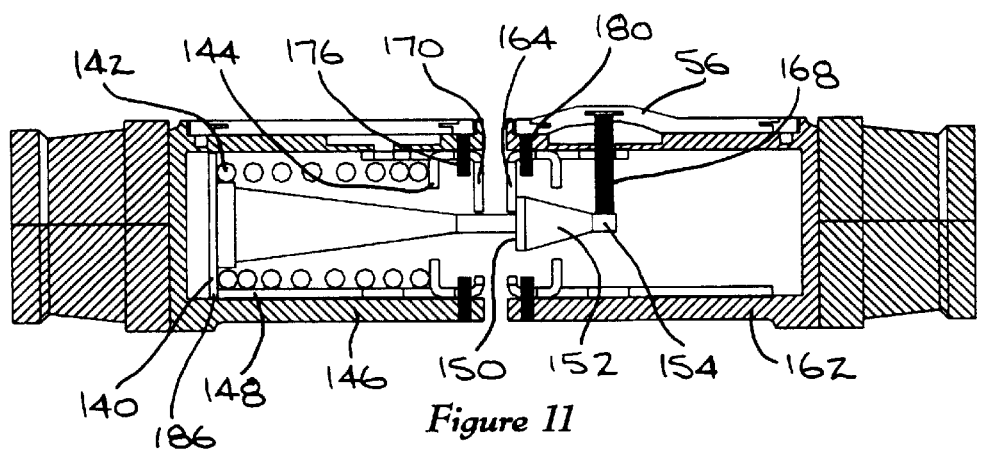
FIG. 11 is a cross-sectional side view of the coupler of FIG. 1 showing the securing device in a completely coupled state experiencing a moderate tensile force.
Figure 12:
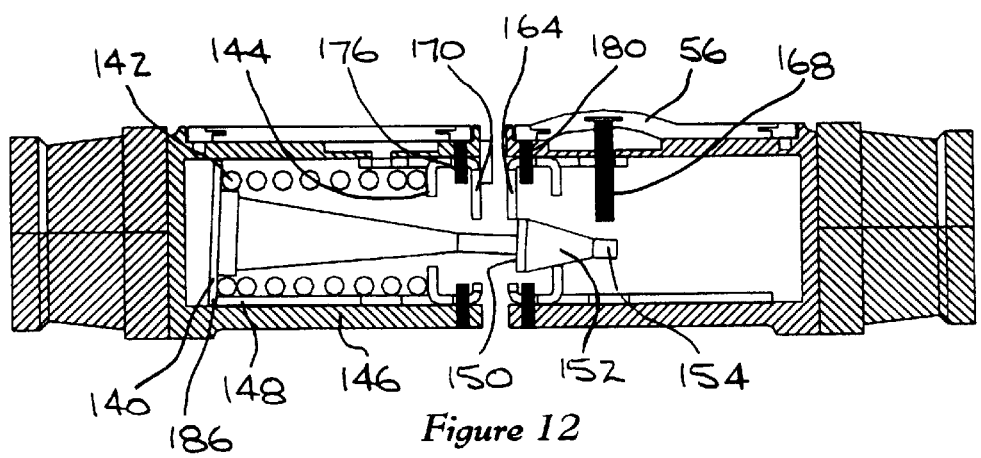
FIG. 12 is a cross-sectional side view of the coupler of FIG. 1 showing the latch assembly in an intermediate state immediately preceding complete automatic uncoupling.

In an emergency or other situation where unusual axial force is placed on the coupling and the conduits which are attached to it, it may be necessary to allow disconnection without manual intervention. For example, if the conduits were feeding heating fluid to a flying suit, and the pilot ejected from an aircraft, it is necessary that the conduits disconnect without impeding the pilots exit from the aircraft. The automatic disconnect feature is illustrated in FIGS. 11 and 12. As axial forces are placed on the coupler tending to disconnect it, it begins to move apart as illustrated in FIG. 11. This occurs because the base plate 140 moves axially within the latch pin housing 146. As side 186 of base plate 140 abuts against plate 148, continued axial force will cause base plate 140 to tilt, thus deflecting shoulder 150 of latch pin 138 out of engagement with latch plate 164, thus allowing the coupler to spring apart under the influence of springs 74 and 118, as described above. Once the two parts are disconnected, latch pin 138 is free to return to its rest position under the influence of spring 142. In appropriate situations the coupler can be reconnected, since it will not have been damaged in any way by the automatic release.

Finally, should the automatic release feature fail, a clean break can still be made if either pair of shear pins 176 and 178 or 180 and 182 shear off. If the first pair shear off, then the assembly within the latch pin housing 146 is free to move out of the housing. Similarly, if the second pair 180 and 182 shear, then the latch plate 164 and associated structure will move out of receptacle housing 162. In either case there will be a successful disconnect without leakage of fluid into or out of the system.

Obviously in the case of emergency release by shearing the shear pins, the coupling cannot be reconnected without repair work.

Thus, it is apparent that there has been provided in accordance with the invention a coupler that fully satisfies the objects, aims and advantages set forth above. While the invention has been described in conjunction with (a) specific embodiment(s) thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

The embodiments of the invention in which an exclusive property or privilege is claimed are defined as follows:

1. An auto-release latch in combination with a fluid conduit coupling that comprises first and second sides that are carried by respective sections of said fluid conduit, said latch comprising:

a first part associated with said first side of said coupling, and a second part associated with said second side of said coupling;

said first part comprising a latch pin and means for biasing said latch pin toward retention in said first side of said coupling;

said second part comprising a latch plate for securing said pin in a locked position when said first and second sides are axially brought together to effect coupling of said fluid conduit sections;

wherein said first and second coupling sides are free from attachment to any structure other than said fluid conduit sections and one another;

manual release means for selectively removing said pin from said locked position responsive to user activation; and automatic release means responsive to a first predetermined tensile force for automatically removing said pin from said locked position.

2. The combination of claim 1 wherein said pin is deflectable against said means for biasing, wherein said pin includes a camming surface and a latching surface, and wherein said latch plate includes a cooperating camming surface whereby when said first and second parts are brought together, said camming surfaces cause said pin to deflect to pass over said latch plate and to then return to a position in which said latching surface is locked in engagement with said latching pin.

3. The combination of claim 2 wherein said manual release means comprises a deflection assembly within said second part of the latch for manually deflecting said pin when in said locked position to thereby release said pin for retraction over said latch plate.

4. The combination of claim 1 wherein said pin includes an annular base plate located within said first part of the latch and said biasing means comprises a coil spring acting on said base plate whereby deflection of said pin causes compression of one side of said coil spring.

5. The combination of claim 2 wherein said automatic release means comprises means for deflecting said pin out of said locked position responsive to said axial force.

6. The combination of claim 5 wherein said pin includes thereon a base plate; said base plate is axially moveable against said biasing means; said first part of said latch includes a stop means for limiting said axial movement of said base plate on at least one side of said pin by abutment of said base plate against said stop means; whereby continued axial force above said first predetermined force acting on said pin against said biasing means will cause said pin to deflect out of said locked position.

7. The combination of claim 6 wherein said latch plate is secured in position by at least one shear pin; wherein said at least one shear pin is chosen to shear under a second predetermined axial force which is greater than said first predetermined axial force.

8. The combination of claim 7 wherein said latch includes retaining means for retaining said biasing means and wherein said retaining means is secured in position by at least one said shear pin chosen to shear under a third predetermined axial force.

9. The combination of claim 8 wherein said second and third predetermined axial forces are equal.

10. An auto-release latch for use in a fluid conduit coupling, said latch comprising:

a first side for association with one side of said coupling, and a second side for association with an opposite side of said coupling;

said first side comprising a latch pin and means for biasing said latch pin toward retention in said one side of said coupling;

said second side comprising a latch plate for securing said pin in a locked position when said first and second sides are axially brought together to effect coupling;

manual release means for selectively removing said pin from said locked position responsive to user activation;

automatic release means comprising means responsive to a first predetermined tensile force for automatically deflecting said pin from said locked position;

wherein said pin is deflectable against said means for biasing, wherein said pin includes a canning surface and a latching surface, and wherein said latch plate includes a cooperating camming surface whereby when said first and second sides are brought together, said camming surfaces cause said pin to deflect to pass over said latch plate and to then return to a position in which said latching surface is locked in engagement with said latching plate;

wherein said pin includes thereon a base plate; said base plate is axially moveable against said biasing means; said one side of said latch includes a stop means for limiting said axial movement of said base plate on at least one side of said pin by abutment of said base plate against said stop means, whereby continued axial force above said first predetermined force acting on said pin against said biasing means will cause said pin to deflect out of said locked position; and wherein said latch plate is secured in position by at least one shear pin; said at least one shear pin being configured to shear under a second predetermined axial force which is greater than said first predetermined axial force.

11. An auto-release latch for use in a fluid conduit coupling, said latch comprising:

a latch pin housing for attachment to one side of the coupling and a latch plate housing for attachment to a opposite side of the coupling;

said latch pin housing supporting therein an elongate latch pin that has a tip portion that extends axially outwardly of said latch pin housing, biassing structure operative to resiliently retain said latch pin in an axially oriented disposition, said tip portion being transversely deflectable from said axially oriented disposition;

said latch plate housing having a recess for receiving said latch pin tip portion and a latch plate in said recess for securing said latch pin in a locked position, said latch plate being configured for engagement with said tip portion when the latch pin housing and latch plate housing are moved axially together upon engagement of said coupling, during such axial movement said tip portion being resiliently deflected until it moves Into a locking position with respect to said latch plate where said tip portion is restored to its axially oriented disposition by said biassing structure and is locked against withdrawal by engagement of said tip portion with said latch plate;

said latch including a manual release mechanism which is operative to disengage said pin from said latching plate in response to user activation, said manual release mechanism being enclosed within one of said housings; and automatic release means for automatically disengaging said latch in response to a tensile force of predetermined magnitude, by deflecting the latch pin tip from its axially oriented disposition to release it from engagement with said latch plate.

12. The latch of claim 11 wherein said manual release mechanism comprises a button on a surface of one of said housings, said button being connected to a release pin located in the interior of said one housing, said button being biased to an inactive position but being manually displaceable when said housings are coupled to press said release pin against said latch pin and reflect the latter to disengage the tip portion thereof from the latch plate and thus free said housings for separation.

* * * * *

UNITED STATES PATENT AND TRADEMARK OFFICE
CERTIFICATE OF CORRECTION

PATENT NO. : 6,547,284 B2
DATED : April 15, 2003
INVENTOR(S) : Rose et al.

It is certified that error appears in the above-identified patent and that said Letters Patent is hereby corrected as shown below:

<u>Title page,</u>
Item [56], References Cited, U.S. PATENT DOCUMENTS, "12/1953" should read -- 2/1953 --; and "Webster" should read -- Haunhorst --.

<u>Column 9,</u>
Line 5, "canning" should read -- camming --;
Line 29, "a" should read -- an --;

<u>Column 10,</u>
Line 8, "Into" should read -- into --; and
Line 33, "reflect" should read -- deflect --.

Signed and Sealed this

Twenty-seventh Day of January, 2004

JON W. DUDAS
*Acting Director of the United States Patent and Trademark Office*